United States Patent [19]
Schmid et al.

[11] Patent Number: 5,552,686
[45] Date of Patent: Sep. 3, 1996

[54] SERIES MOTOR, IN PARTICULAR UNIVERSAL MOTOR WITH BRAKE DEVICE

[75] Inventors: Wolfgang Schmid, Filderstadt; Werner Rieker; Eckerhard Stroetgen, both of Waldenbuch; Csaba Kreiter, Stuttgart; Ottmar Seel, Leinfelden-Echterdingen, all of Germany

[73] Assignee: Robert Bosch GmbH, Stuttgart, Germany

[21] Appl. No.: 301,295

[22] Filed: Sep. 6, 1994

[51] Int. Cl.⁶ ........................................ H02P 3/00
[52] U.S. Cl. ............................ 318/362; 318/251
[58] Field of Search ........................ 318/362, 364, 318/375, 378, 380, 244–252

[56] References Cited

U.S. PATENT DOCUMENTS

| | | | |
|---|---|---|---|
| 2,523,143 | 9/1950 | Riley et al. | 318/249 |
| 3,548,276 | 12/1970 | Gross | 318/245 |
| 3,875,485 | 4/1975 | Hornung | 318/244 |
| 4,213,077 | 7/1980 | Hornung et al. | 318/250 |
| 4,250,436 | 2/1981 | Weissman | 318/245 |
| 4,264,846 | 4/1981 | Sauer et al. | 318/249 |
| 4,393,344 | 7/1983 | Whellams | 318/759 |
| 4,422,021 | 12/1983 | Schwarz | 318/261 |
| 5,099,184 | 3/1992 | Hornung et al. | |
| 5,294,874 | 3/1994 | Hessenberger et al. | 318/245 X |
| 5,334,919 | 8/1994 | Wilard | 318/375 |

FOREIGN PATENT DOCUMENTS

| | | |
|---|---|---|
| 0367987 | 5/1990 | European Pat. Off. . |
| 4004785 | 2/1992 | Germany . |
| 2241119 | 8/1991 | United Kingdom . |

*Primary Examiner*—Jonathan Wysocki
*Attorney, Agent, or Firm*—Michael J. Striker

[57] ABSTRACT

A series motor has a braking device, a stator having a field winding and a pole shoe plate pack, the pole shoe plate pack of the stator having field coils and also having a further element inducing a magnetic field, a rotatable armature, and an element for influencing a braking operation of the field winding.

23 Claims, 11 Drawing Sheets

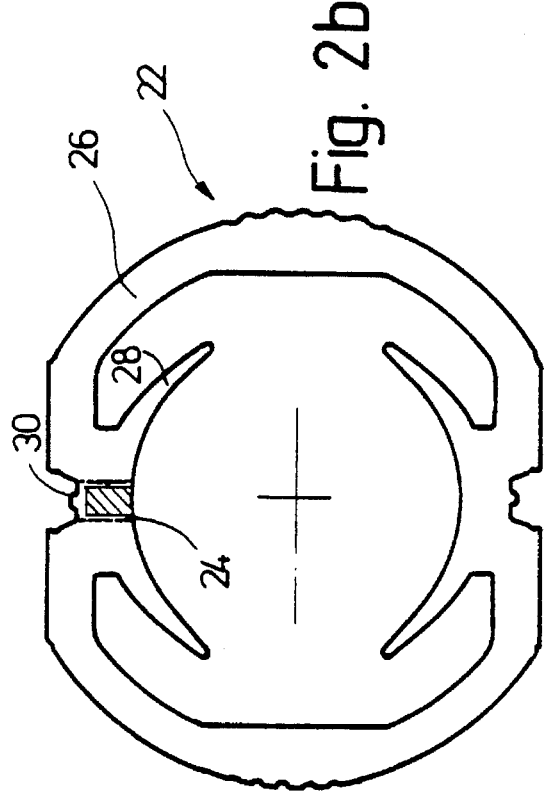
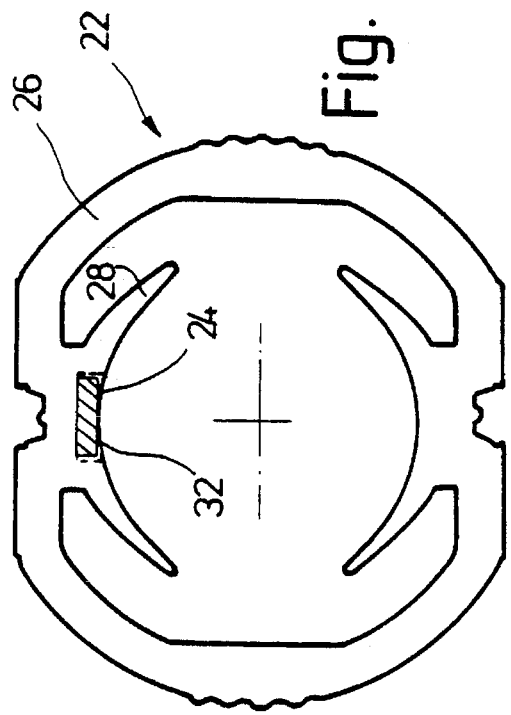
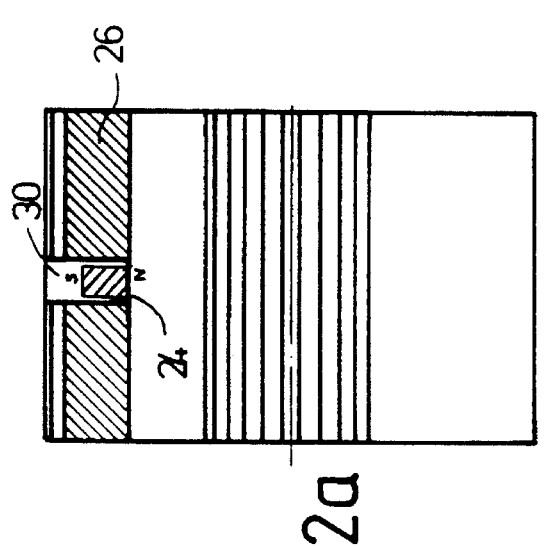
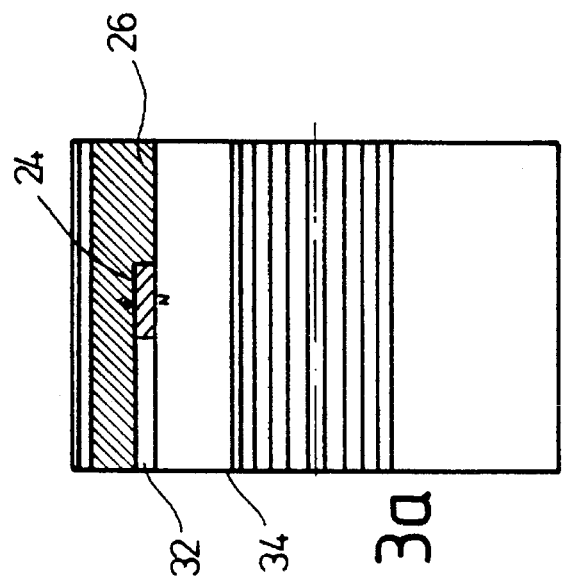

SERIES MOTOR, IN PARTICULAR UNIVERSAL MOTOR WITH BRAKE DEVICE

BACKGROUND OF THE INVENTION

The present invention relates to a series motor, in particular universal motor, with a brake device.

Series motors which are frequently identified as universal motors are utilized for example as electrical hand tools such as shears, chain saws, lawn mowers, grinding tools, circular saws or electrical planes. After turning off the system voltage, these machines, due to the kinetic energy of their drives, have a long post-running time. The post-running cutters, shears, saws, grinding discs or chains pause for the operators of these devices a substantial injury risk.

It is therefore advantageous, during turning off of the system voltage to provide a fast braking of the motor and thereby the tool.

It is known to use mechanical braking devices for braking the motor. They however are less suitable since they have the construction which is complicated, expensive and wear prone.

It is further known to provide an electric braking of universal motors by a self-excited short circuiting on the permanent induction in the magnetic circuit of the motor. This however has this disadvantage that the voltage induced by the permanent induction in the armature is not always sufficient to reliably initiate the self-excitement of the universal motor. For removing these disadvantages it has been proposed to perform the ignition of the braking process by a capacitor which is charged through a diode during the operation time. This is however disadvantageous since the ignition process can be performed only once, so that when it is elapsed a new ignition is no longer possible.

The German patent document DE-OS 38 37 943 discloses an approach in accordance with which the ignition is performed by a capacitor which is loaded after turning off of the motor with alternative voltage. Here, the current flowing through the capacitor is produces in the field coil located outside the braking circuit an electric field which induces in the rotatable armature a voltage sufficient for reliable ignition of the braking process.

In addition to a substantially great additional mounting space for the capacitor, this approach has the disadvantage that the capacitor and thereby a field winding of the plugged-in device the total time depends on the electrical system. Since for reliable ignition of the braking process correspondingly greatly dimensioned capacitors are required, the current which flows through the capacitor causes an imbalanced interference.

SUMMARY OF THE INVENTION

Accordingly, it is an object of the present invention to provide a series motor of the above mentioned general type, which avoids the disadvantages of the prior art.

More particularly, it is an object of the present invention to provide a series motor of the above mentioned type in which in a simple manner a reliable self-excitement of the motor is obtained during turning off of the electrical system and thereby a minimalization of the post-running of the tools is provided.

In keeping with these objects and with others which will become apparent hereinafter, one feature of the present invention resides, briefly stated, in a series motor in which, in addition to the field coils a means producing a magnetic field, for example a permanent magnet is associated with the stator and the switching device has a time function element.

It has been found that in this construction during an electrodynamic braking in accordance with the principle of the self-excitation, during the switching over from normal operation in the braking operation for sufficiently long time, the field coil located outside of the braking current circuit or the further means producing a magnetic field can be powerfully excited so that a great induction voltage in the running armature and thereby a reliable ignition of the braking process is actuated.

In accordance with an advantageous embodiment of the invention, it is provided that in at least one pole of the pole shoe plate pack an opening or a groove is formed for arranging the permanent magnet.

The permanent magnet is therefore arranged so that its magnetic field acts in the same direction as the field lines of the electrically exciting main flux when the intensity of the magnet is selected preferably so that its field is at least double as the field due to permanent induction. Therefore also in the case in which the permanent induction acts against the permanent magnet field, a reliable self-excitation can be performed.

In accordance with a further embodiment of the invention, the circuit arrangement for switching over from the motor operation and the generator operation has a time function member which contains a three-pole switch. At least one contact set of the switch is formed as a wiping contact which during the turning off process supplies a current to the field coils. In this construction in an advantageous manner it is provided that the excitation current circuit is closed by the wiping contact after turning off of the motor for a definitely adjustable time and the field coil located outside the braking current circuit is excited with a powerful alternating current providing the reliable ignition of the braking process.

In accordance with a further embodiment of the present invention, the switching device for the time function member has a relay, and a Slow release is associated with it so that the contacts of the relay which connect the field coil with the electrical system are offset separated by a definitely predetermined time. With such a construction a reliable self-excitation of the motor is obtained in advantageous manner after turning off of the electrical system.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 2a and 2b are views showing a longitudinal section and a transverse section of a pole shoe plate with arranged permanent magnets;

FIGS. 3a and 3b are further longitudinal and transverse sections of a pole shoe plate with associated permanent magnets;

DESCRIPTION OF THE PREFERRED EMBODIMENTS

Figure 1:
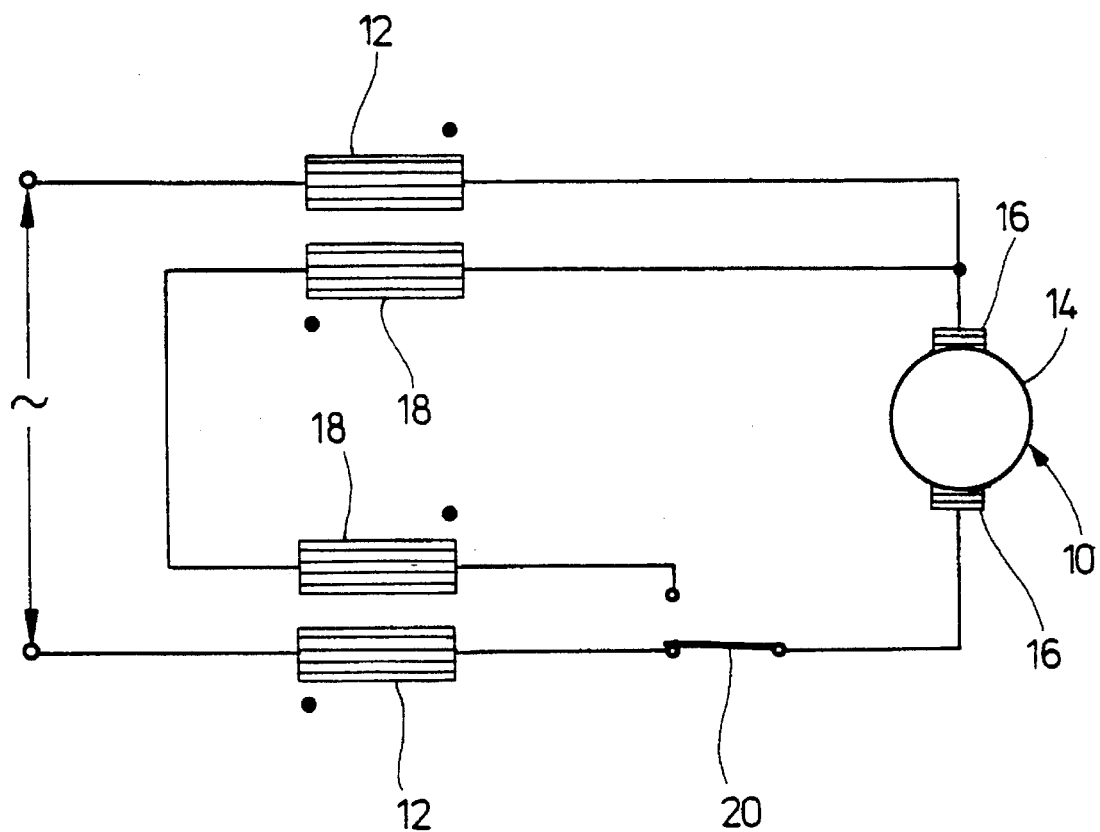
FIG. 1 is a view showing a switching arrangement of a series motor in accordance with the present invention.

FIG. 1 shows a switching arrangement of a series motor identified as a whole with reference numeral 10. The series motor 10 has field coils 12 which are connected in series with commutating coils 16 arranged in an armature 14. Furthermore, auxiliary coils 18 are arranged in series. On the one hand they are connected with a switching contact of a switch 20 and on the other hand they are connected with the commutating coils 16. The switch 12 is formed as a one-pole switch, while a second switching contact is connected with one of the field coils 12.

The above described circuit shown in FIG. 1 operates as follows:

The motor 10 is located in the shown switching position in the motor operation. By switching over of the switch 12 the motor 10 is switched to the generator operation and thereby braking operation by short circuiting the commutating coils 16 through the auxiliary coils 18. The auxiliary coils 18 have a reverse winding direction when compared with the field coils 12. Thereby in advantageous manner it is possible to form the switch 20 as a one-pole switch.

In the motor operation an operation field is produced over the field coils 12 which together with a produced armature field provides a resulting field required for the motor operation. By switching over the switch 20 a voltage is induced by the residual induction and leads to a magnetic field extending from the auxiliary coil 18. These fields are superimposed and form a self-igniting braking field. The braking field, i with minimal resonance which is practically always available is reliably set and leads to a fast braking of the series motor 10.

FIGS. 2a, 2b, 3a, and 3b show a further series motor 22, in which a permanent magnet 24 is arranged in an opening 30 or groove 32 of the pole 28.

The illustration is made in a simplified form, in particular in transverse and lateral section.

The series motor 22 includes a pole shoe plate pack 26 with poles 28 formed on it. The illustrations of the field coils and the commutating coils are dispensed with for the reason of providing visibility of important parts of the motor.

In accordance with the FIGS. 2a and 2b, the pole shoe metal pack 26 has a thoroughgoing opening 30. The permanent magnet 24 is arranged in the opening 30.

In accordance with FIGS. 3a and 3b the pole shoe metal pack 26 has a throughgoing groove or blind groove 32. The permanent magnet 24 is arranged in the blind groove 32. The blind groove 32 is formed in the axial direction of the motor 22 so that the permanent magnet 24 can be inserted from an end side 34 of the motor 22, so that it can be located substantially centrally of the pole shoe plate pack 26.

The shown arrangement of the permanent magnet 24 performs the following function.

The permanent magnet 24 is mounted in or on the pole 28 of the series motor 22 so that its magnetic field acts in the same direction as the magnetic lines of the electrically excited main flux. The intensity of the permanent magnet 24 is selected so that its field is at least double of the field due to the residual induction in the iron of the pole shoe metal pack 26. Therefore also in the case when the residual induction in the switching over time point for the motor operation to the generator operation acts against the field of the permanent magnet 24, sufficient reserve of the permanent magnet field is available for reliably providing the self-excitation.

In the exemplary arrangement of the permanent magnet 24 in FIGS. 2a and 2b the magnetic return connection at the south pole of the permanent magnet 24 extends partially through air, so that the arrangement possibility of the permanent magnet 24 shown in FIGS. 3a and 3b provides the advantage due to the favorable magnetic field distribution. For improving the use of the magnetic material of the permanent magnet 24 the short circuiting of the permanent magnet field through the surrounding iron of the pole shoe metal pack 26 are avoided, when the permanent magnet 24 is surrounded outside of the pole ends by a sufficiently thick layer of non-magnetic material. This sufficiently thick layer of non-magnetic material can be either air or a synthetic plastic.

In the advantageous manner the permanent magnet 24 can be surrounded by an injection molded synthetic plastic layer which corresponds to the opening 20 or blind groove 32, so that the mounting of the permanent magnet 24 in these recesses is facilitated. The mounting at the final place can be formed for example by glueing or a suitable form-locking, for example a dove-tailed connection. With the injection molded plastic around the permanent magnet 24, simultaneously eventual size tolerances can be compensated and the permanent magnet 24 can be mounted easier and faster.

In general, in certain applications due to the use of a permanent magnet 24 cost favorable, variable and space economical embodiment of a short-circuiting series motor or universal motor with auxiliary excitation is therefore provided.

Figure 4A:
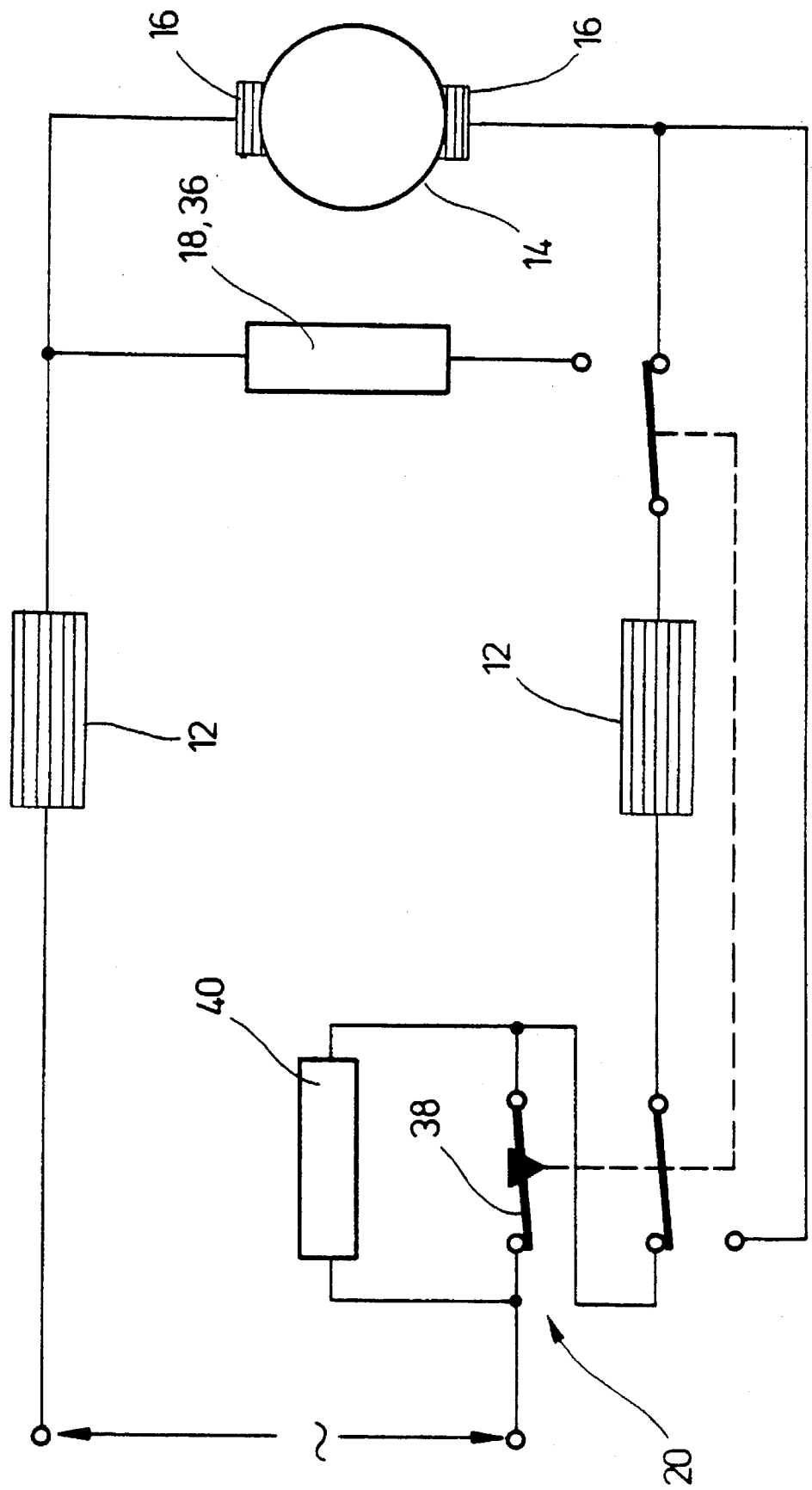
FIGS. 4a and 4b are views showing two further embodiments of a braking device.
Figure 4B:
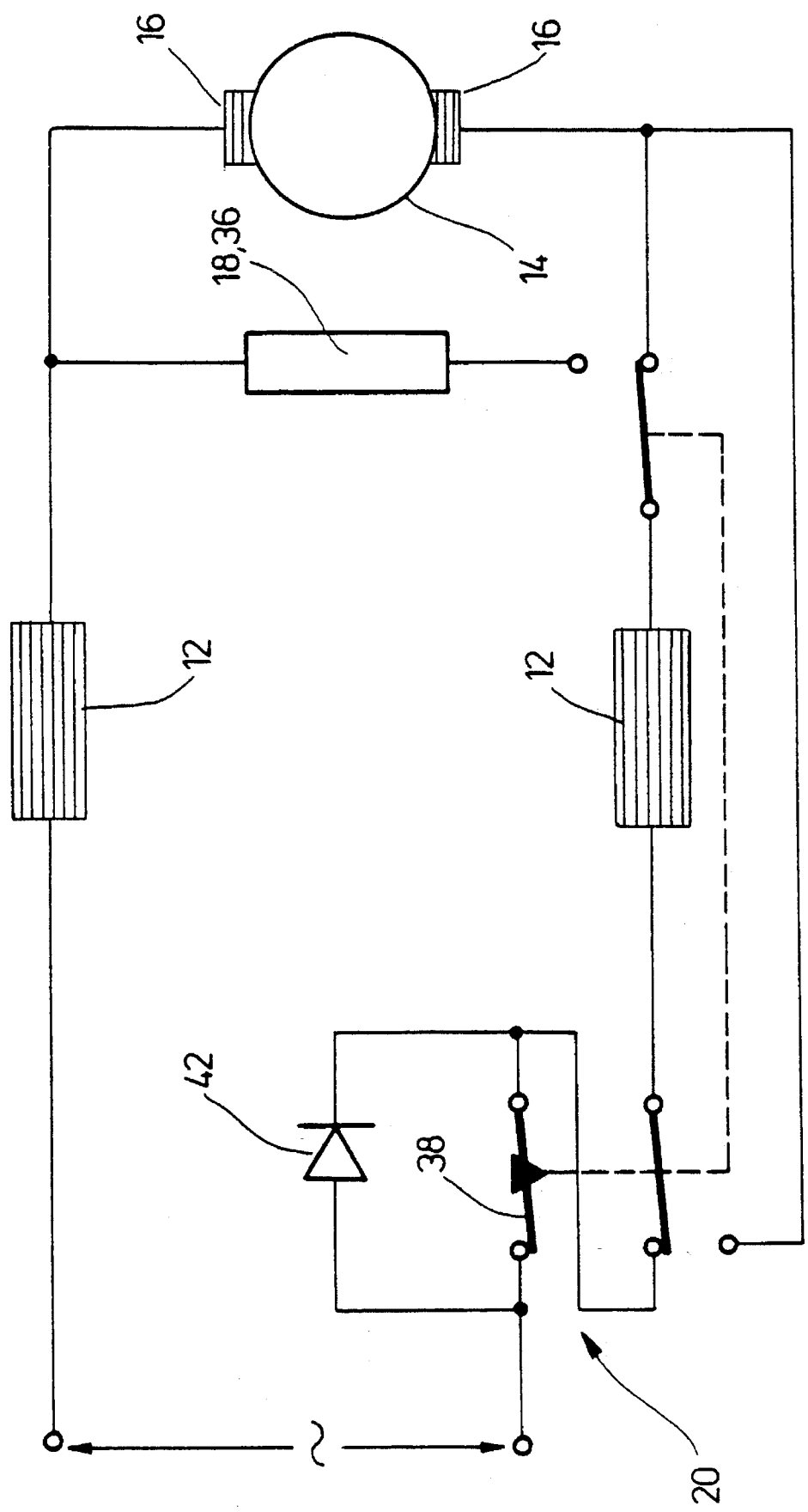

FIGS. 4a and 4b show a formation of a permanent magnet used based on FIG. 1.

The magnetic properties and sizes of the permanent magnet 24 must be selected so that the permanent magnet 24 can not be demagnetized by the electromagnetic fields produced by the armature current. In this connection critical are the peak value of the provided braking current after the short circuiting of the commutating coils 16.

The current direction is determined by the initiating field of the permanent magnet 24 and cannot be influenced. The intensity of the current can be influenced by the ohmic resistance value of a brake resistor 36 or the brake excitation windings (auxiliary coils 18).

Furthermore, the peak value of the motor starting current during switching on in the half wave is critical, and its armature field counteracts the permanent field of the permanent magnet 24. For this purpose a completion of the braking circuit in accordance with FIG. 1 is shown.

In FIG. 4a by means of an additional delayed contact 38 in the switch 20, the system voltage is not switched in full intensity to the motor 10, but instead first via a starting resistor 20 connected in parallel to the contact 38. This starting resistor 40 limits the current in the armature 14 to an uncritical value for the permanent magnet 24.

In accordance with FIG. 4b the starting resistor 40 is replaced by a diode 42, so that the starting current first can flow only in one direction. Preferably the current direction of the diode 42 and the polarity of the permanent magnet 24 are so determined relative to one another that the armature field of the starting current of the permanent magnet 24 acts only in field-supporting way.

When the respective parallel-connected, delayed switching contact 38 is closed, the starting current is lowered to a value uncritical for the permanent magnet 24.

In the further embodiments, with the basic advantage of the electrodynamic braking of a series motor via an auxiliary coil 18 or a permanent magnet 24, the release of the braking process starts with a self-excitation.

Figure 5:
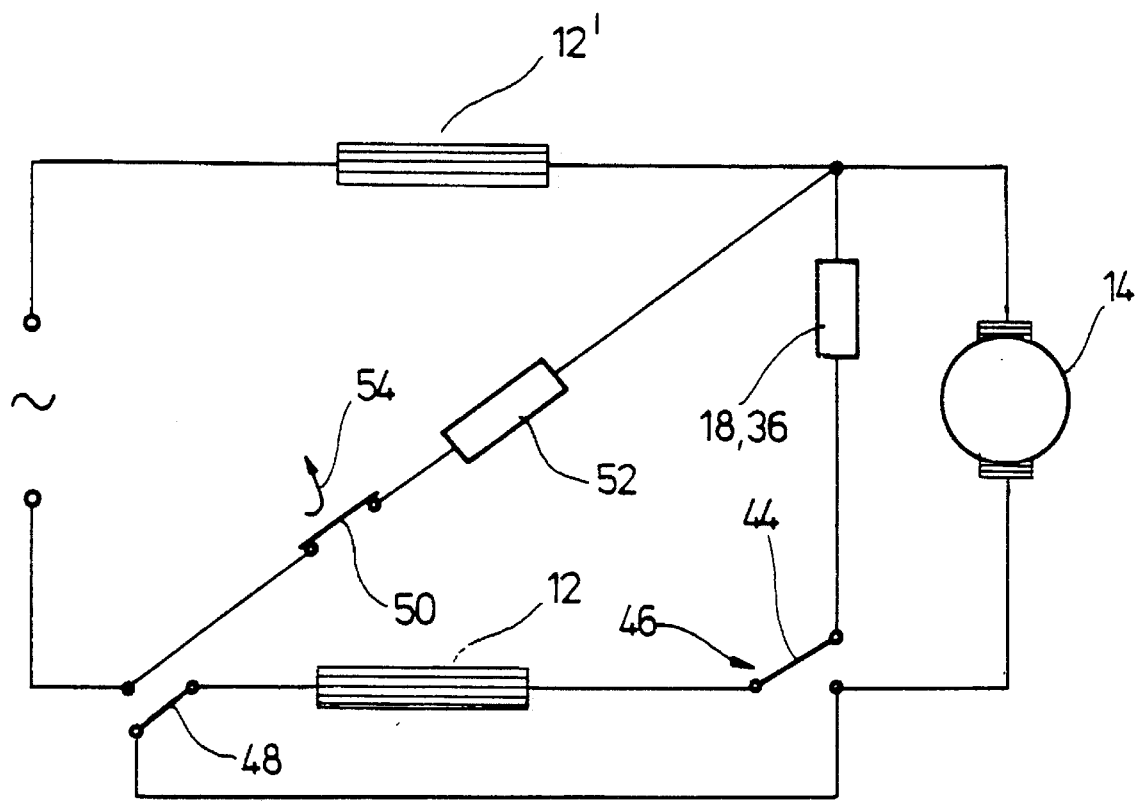
FIG. 5 is a view showing a further switching arrangement of a series motor in accordance with the present invention.

FIG. 5 shows a basic construction of a circuit arrangement of a series motor. FIG. 5 shows field coils 12 and 12' whose armature 14 is connected in series. The field coils 12 and 12' are connected with their free ends to a voltage supply system. Parallel to the armature 14 a resistor (addition coils 18; braking resistance 36) is connected, which can be connected through a contact set 44 of a three-polar change-over switch 46 with a terminal of the switchable over field coil 12. The second Contact set 48 of the change over switch 46 connects the second end of the field coil 12 depending on the position of the change-over switch 46, either to the voltage supply system or to the armature 14.

The third contact set 15 is connected between a terminal of the voltage supply system and the not free end of the field coil 12', in series with a resistor 52. The contact set 50 is therefore formed as a wiping contact 54.

Figure 6:
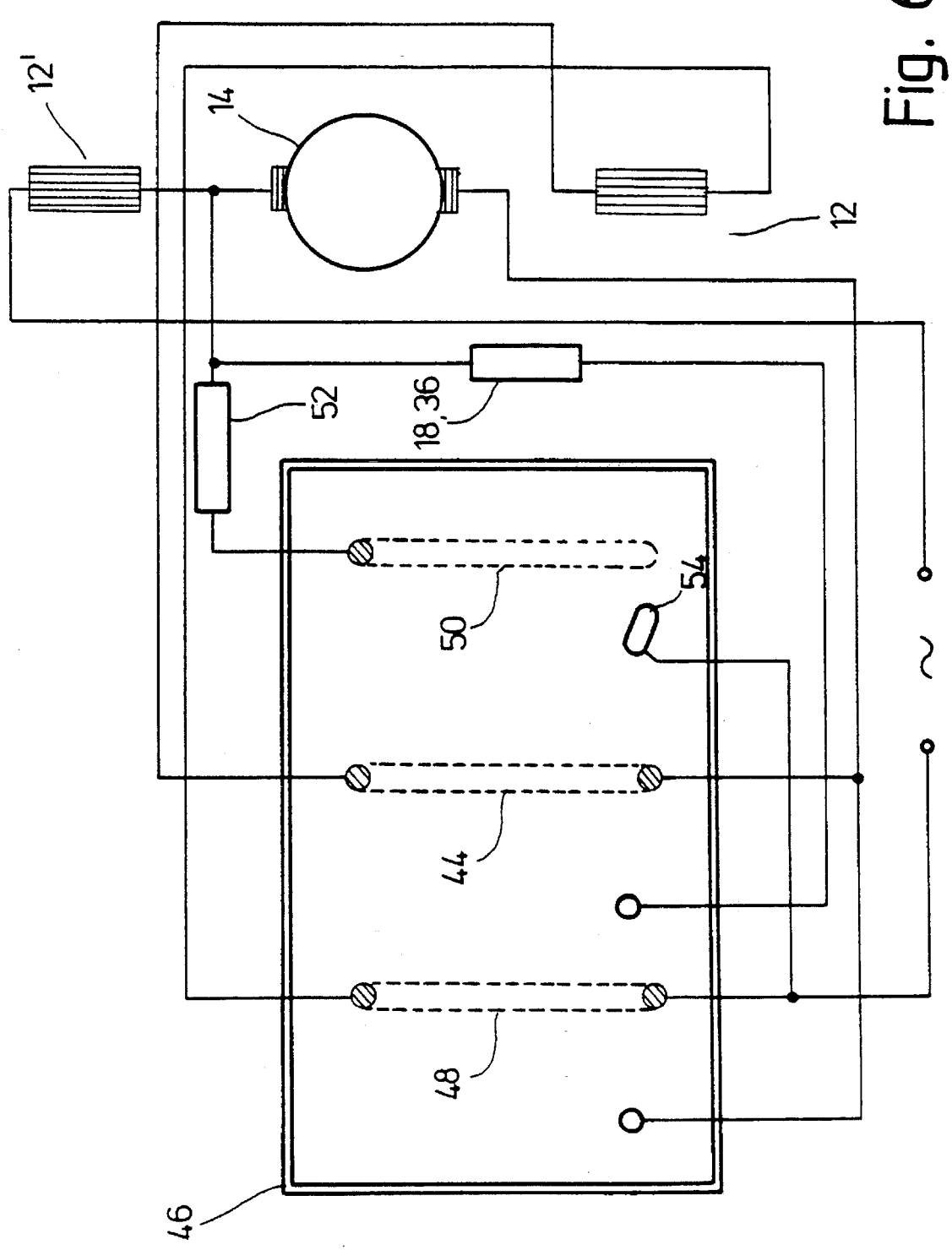
FIG. 6–8 are views showing further switching arrangement of a series motor.
Figure 7:
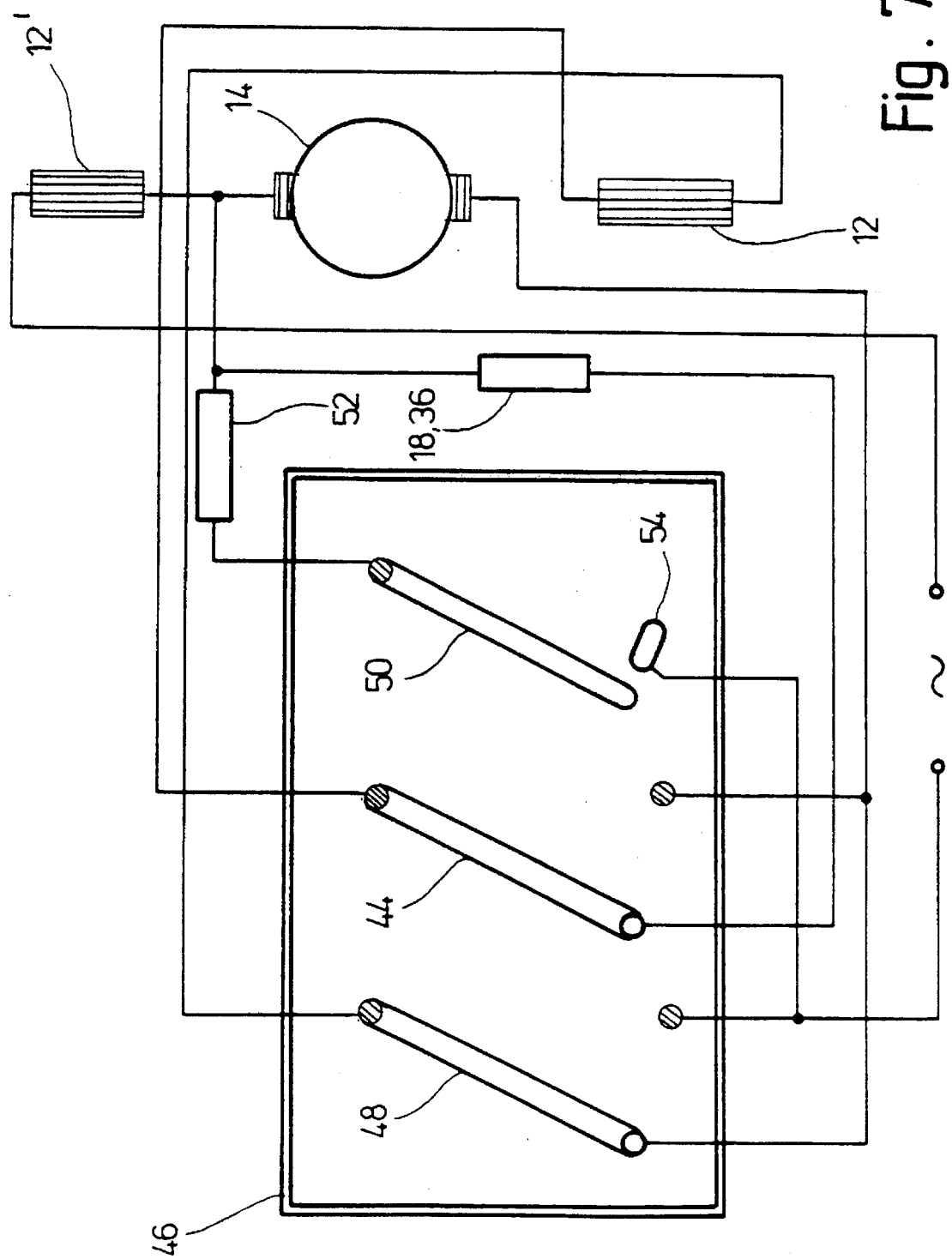
Figure 8:
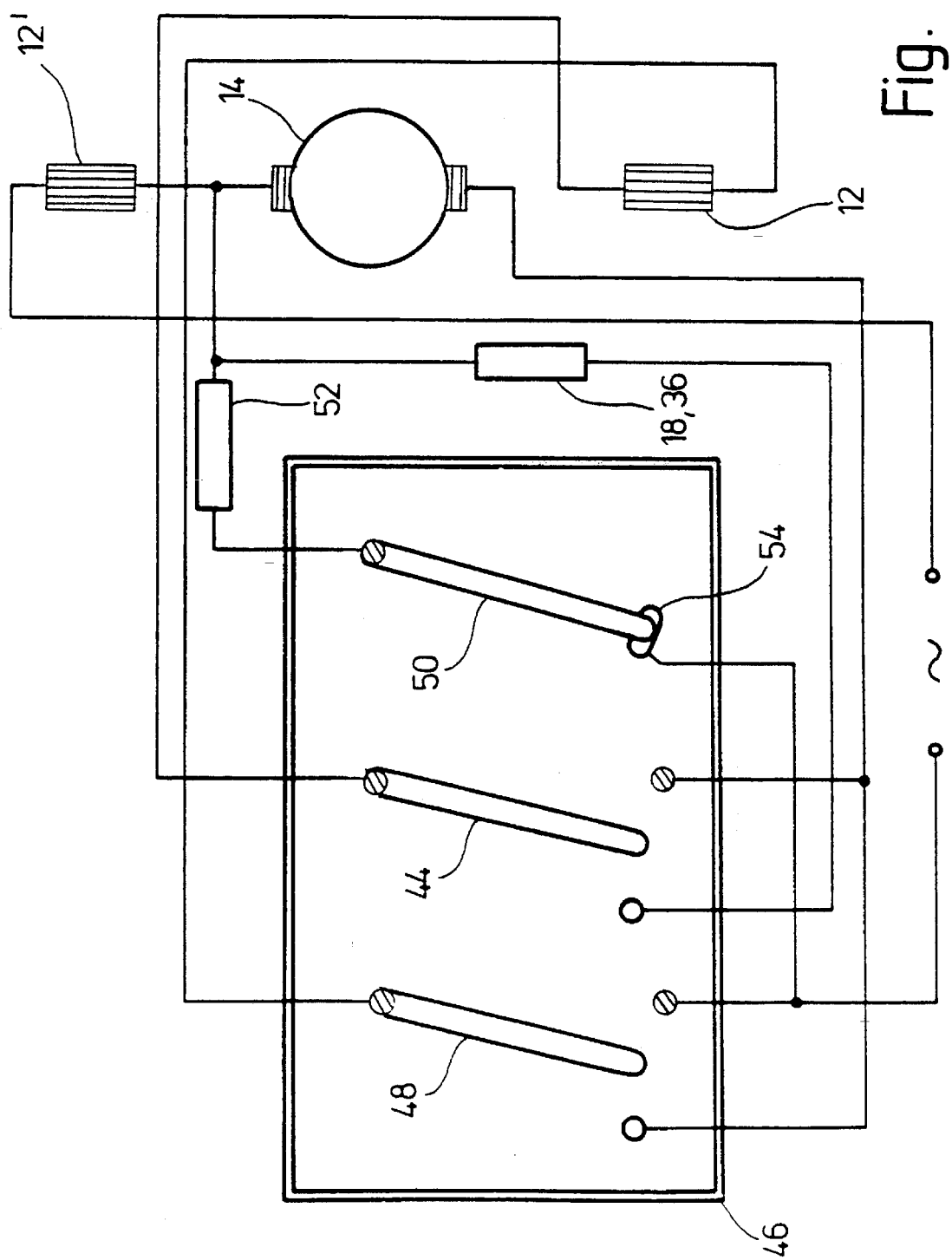

FIGS. 6, 7, and 8 show the switching arrangement of FIG. 5 with the change-over switch 46 which is enlarged for better illustration of different switching conditions. FIG. 6 shows the change-over switch 46 in switched on condition or in other words in motor operation. Therefore the normal motor current flows through the closed contact set 48 as well as field coil 12, the contact set 44 which is also closing, the armature 14 and the field coil 12'.

FIG. 7 shows the change-over switch 46 in the position in which the series motor is in generator operation or in other words in the braking position. Here due to switching over of the change-over switch 46 the braking current flows through the contact set 48, the field coil 12, the contact set 44, the resistor 52 and the armature 14. By the switching over the field coil 12 is connected in series to the resistor 18, 36 and to the armature 14. A pole reversal of the field coil 12 is performed.

FIG. 8 shows the change-over switch 46 in an initializing position, whose importance is explained hereinbelow. During the switching over of the change-over switch 46 the contact set 50 Contacts for a predetermined time a wiping contact 54. During this contacting in which the motor is no longer in the motor operation and is located in generator operation, an initializing current flows through the contact set 50, the resistor 52 and the field coil 12'.

The circuit arrangement of FIGS. 5–8 performs the following functions:

During leaving the motor operation the contact sets 48 and 44 are opened, and the contact set 50 no longer contacts the wiping contact 54. For this time period the motor is first completely currentless. Short time later the contact set 50 extends over the wiping contact 54 and as a result a current flows through the field coil 12'. During further approaching of the contact sets 48 and 44 to the off position and thereby braking position, the contact set 50 is located in contact with the wiping contact 54. Thereby a powerful magnetic field is produced via field coil 12' and induces in the armature 14 a sufficient induction voltage, so that a reliable ignition of the braking process in the generator operation of the motor is obtained. After the change-over switch 46 reaches its end position, the connection through the contact set 50 and the wiping contact 54 is again open. The field coil 12' is thereby currentless. However, the braking stream induced by the field coil 12 becomes so high that an interruption of the braking is impossible.

With the above described circuit it is achieved that the field coil 12' located outside the braking circuit forms for the transition time of the switching over from the motor operation to the generator operation an induction voltage which guarantees a reliable ignition of the braking.

By preliminarily determining the length of the wiping contact 54, the duration of time in which the initializing current must flow can be determined. For providing a reliable ignition of the braking, the duration of time must be adjusted so that the contact set 50 remains in connection with the wiping contact 54 at least for an uneven multiple of the duration of time of a half wave of the system voltage.

Figure 9:
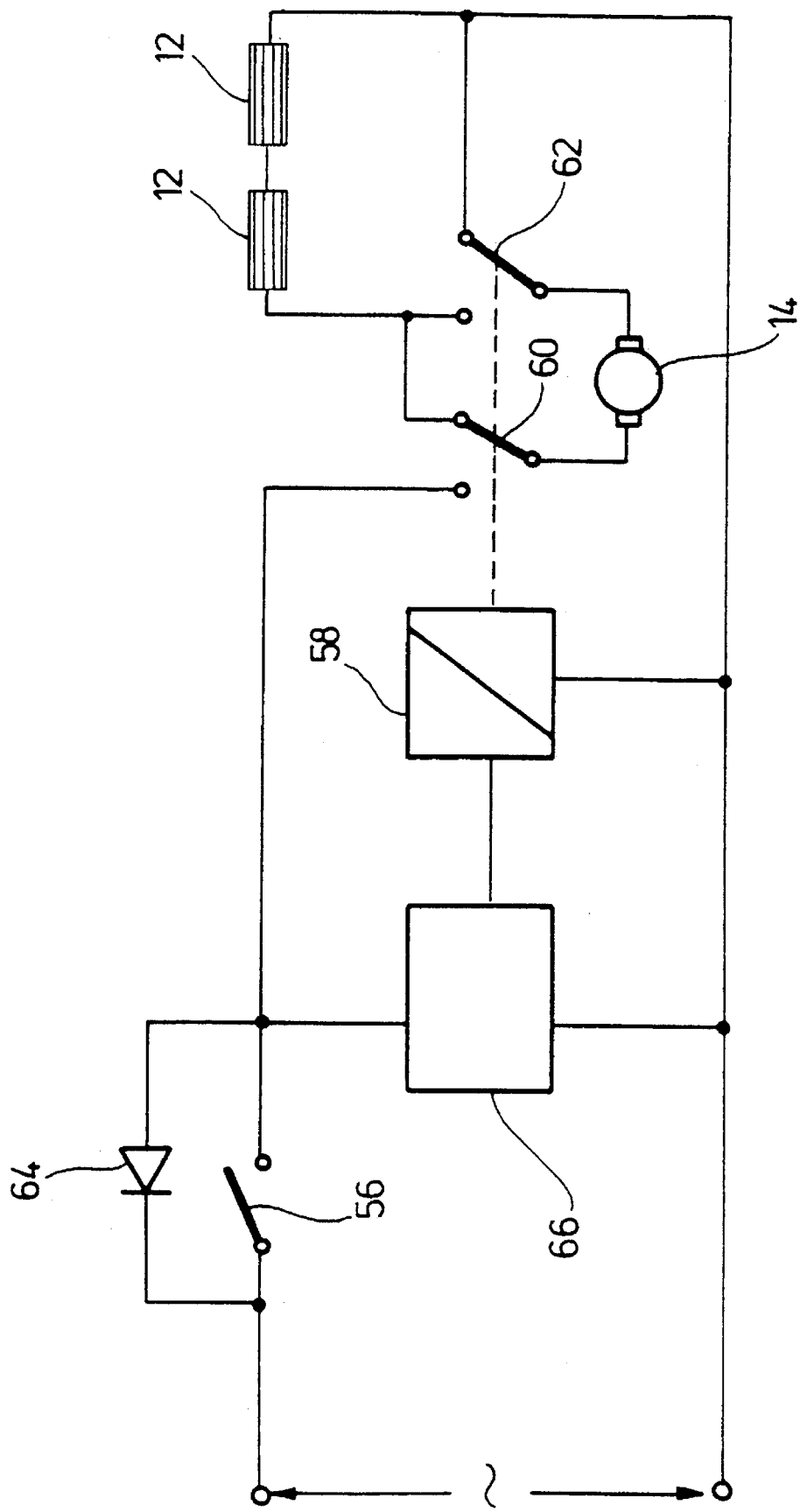
FIGS. 9–11 are views showing further switching arrangements of a series motor of the present invention.
Figure 10:
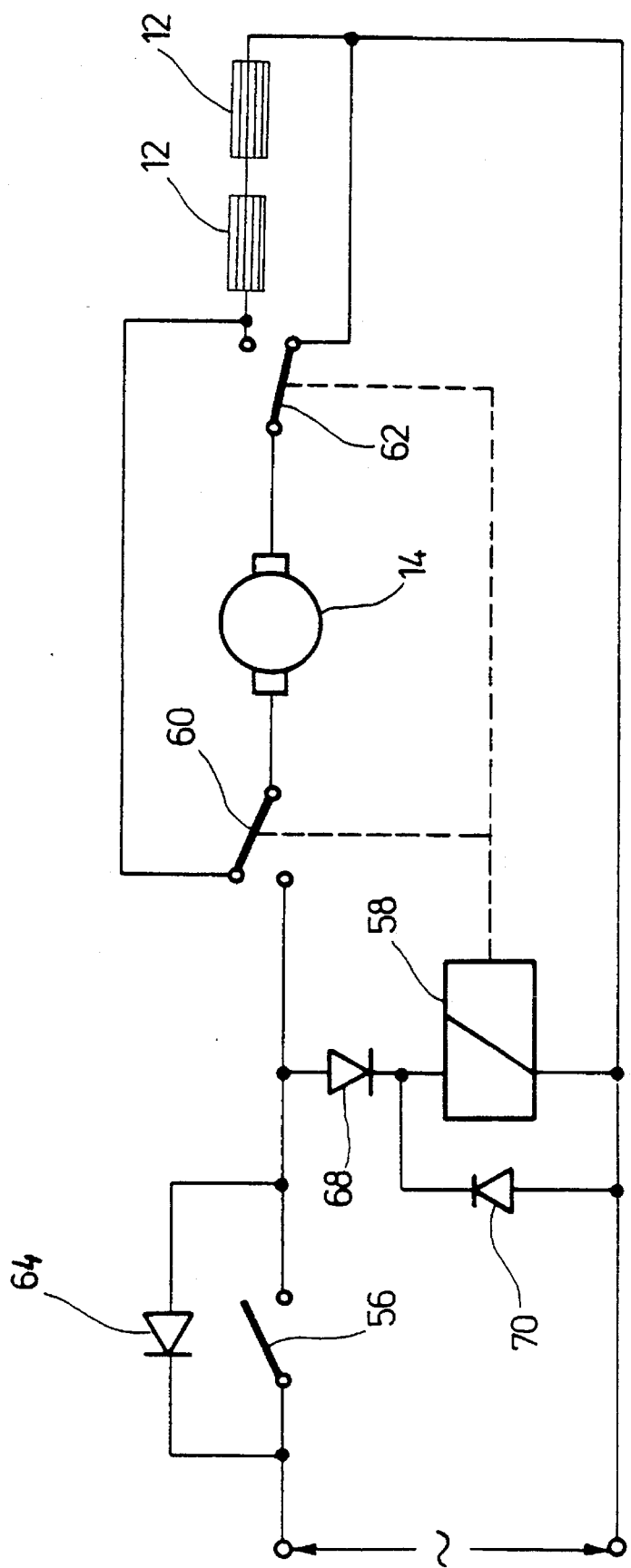
Figure 11:
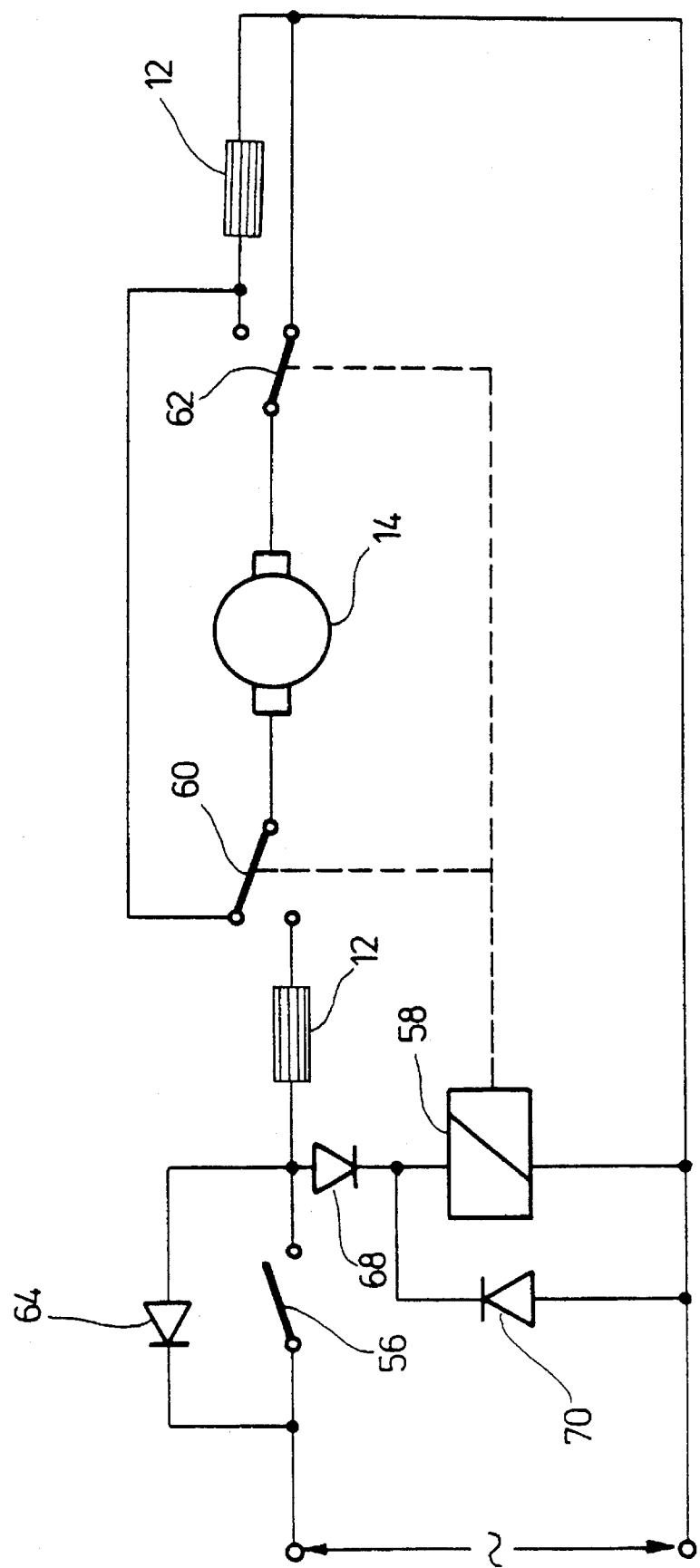

In accordance with the embodiment shown in FIGS. 9–11, the short time induction described with respect to FIGS. 5–8 further forms a voltage by the field coil located outside of the braking circuit. In contrast to the above described mechanically acting wiping contacts 54, the same action is provided here in electronic way.

The circuit of FIG. 9 has for this purpose an on-off switch 56 which in a closed condition closes a relay 58. The contact sets 60 and 62 associated with the relay 58 connect in the closed condition of the switch 56 the armature 14 with the field coil 12 in series. The switch 56 is further connected in parallel to a rectifier diode 64. With the parallel connection from the switch 55 and rectifier diode 64, a slow release member 66 associated with the relay 58 is located in series.

When the circuit is connected to a system voltage and the switch 56 is actuated, the total circuit is located in the motor operation. A current flows through the switch 56 of the switched-over contact sets 60 and 62 of the relay 58, as well as the armature 14 and the field coils 12. When the motor operation must be ended. The switch 56 is open however it retains the contact sets 60 and 62 in a motor operation position due to the slow release member 66 of the relay 58. Thereby a pulsating direct current flows through the rectifier diode 64 as well as the closed contact set 60 and 62 and also the armature 14 and the field coils 12.

The pulsating direct current flows as long as the slow release time of the slow release member 66 is adjusted. It is therefore provided that after the switching over of the motor from the normal operation to the generator operation or in other words the braking operation, for a sufficiently long time determined by the slow release time of the relay 58 the pulsating direct current flows through the motor for producing a maximal residual induction.

Thereby optimal conditions are provided for a self-excitation. The slow release is adjusted so that it amounts to at least 20 msec.

It is therefore provided that at least a half wave of the system voltage of the motor is premagnetized. A further advantage is that the slow release time is adjusted to an uneven multiple of the duration of time of a half wave of the system voltage, and all contacts of the braking current circuit are connected in current conducting condition only half as often. Thereby the service life of the contacts are substantially increased.

After release of the relay 56 the contact sets 60 and 62 are switched over and the motor is switched to the braking operation, in that the field coils 12 are located parallel to the armature 14. Due to the provided maximal premagnetizing before the switching over to the braking operation, a reliable ignition of the braking process is ensured.

In the switching arrangements shown in FIGS. 10 and 11 parts which are identical with the parts of FIG. 9 are identified with the same reference numerals.

In FIG. 10 the motor is connected asymmetrically. In other words with the closed switch 56 and thereby the contact sets 60 and 62 closed through the relay 58, the armature 14 and then the field coil 12 are arranged in series.

FIG. 11 shows the same circuit arrangement for a symmetrical motor, in which the motor current with the closed switch 56 flows first through the first field coil 12 and then through the armature 14 and the second field coil 12. The slow release is here provided by a diode 68 connected in series with the relay 58 and a recovery running diode 70 connected parallel to the relay 58. Since the switch 56 for switching off of the motor and therefore the switching off to the generator operation or braking operation is open, a pulsating direct current flows through the rectifier diode 64 and is rectified by the diode 68 connected before the relay 58. By a suitable dimensioning of the recovery running diode 70 and the relay coil of the relay 58 the slow release time can amount to approximately 30 msec.

It is therefore guaranteed that at least a half wave of the system voltage of the motor is premagnetized before the relay 58 is released and thereby the contact sets 60 and 62 connect the motor in the braking circuit.

The operation of this embodiment can be understood from the preceding explanations.

It will be understood that each of the elements described above, or two or more together, may also find a useful application in other types of constructions differing from the types described above.

While the invention has been illustrated and described as embodied in a series motor, in particular a universal motor with brake device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A series motor, comprising a braking device; a stator having a field winding and a pole shoe plate pack, said pole shoe plate pack of said stator having field coils and also having further means inducing a magnetic field; a rotatable armature; means for influencing a braking operation of said field winding; a starting resistor connected before one of said field coils; and a switch having a slow release switching contact and connected in parallel with said starting resistor.

2. A series motor, comprising a braking device; a stator having a field winding and a pole shoe plate pack, said pole shoe plate pack of said stator having field coils and also having further means inducing a magnetic field; a rotatable armature; means for influencing a braking operation of said field winding; and a diode connected before one of said field coils; and a switch having a slow release switching contact and connected in parallel with said starting resistor.

3. A series motor, comprising a braking device; a stator having a field winding and a pole shoe plate pack, said pole shoe plate pack of said stator having field coils and also having further means inducing a magnetic field; a rotatable armature; and means for influencing a braking operation of said field winding, said diode and said permanent magnet being formed so that a current direction of said diode and the polarity of said permanent magnet are adjusted and act on said permanent magnet in a field supporting manner.

4. A series motor, comprising a braking device; a stator having a field winding and a pole shoe plate pack, said pole shoe plate pack of said stator having field coils and also having further means inducing a magnetic field; a rotatable armature; means for influencing a braking operation of said field winding, said means influencing a braking operation including switching means for switching over said field winding to a braking operation, said switching means being provided with time function member, said time function member having a relay with contact sets; a slow release member associated with said relay; and a switch, said contact sets of said relay being formed so that after switching over of said switch between a generator operation and a braking operation said field coils are separated from a system voltage in a time delayed manner.

5. A series motor as defined in claim 4; further comprising a first rectifier diode connected in parallel to said switch and a second diode connected before said relay; and a recovery running diode connected in parallel to said relay.

6. A series motor, comprising a braking device; a stator having a field winding and a pole shoe plate pack, said pole shoe plate pack of said stator having field coils and also having further means inducing a magnetic field; a rotatable armature; and means for influencing a braking operation of said field winding, at least one of said field coils having a switching off delay of at least 20 msec amounting to an uneven multiple of a duration of a half wave of a system voltage.

7. A series motor, comprising a braking device; a stator having a field winding and a pole shoe plate pack, said pole shoe plate pack of said stator having field coils and also having further means inducing a magnetic field; a rotatable armature; means for influencing a braking operation of said field winding, said means influencing a braking operation including at least one means selected from the group consisting of switching means for switching over said field winding to a braking operation and braking means inducing an additional magnetic field in the braking operation, said switching means being provided with time function member; and a commutator and brushes through which said armature is supplied with current.

8. A series motor as defined in claim 7, wherein said switching means includes a three-pole change-over switch having contact sets including at least one contact set having a wiping contact.

9. A series motor as defined in claim 8, wherein said contact sets are formed so that they assume a position in which some contact sets have no contact while said at least one contact contacts with said wiping contacts.

10. A series motor as defined in claim 8, wherein said field coils include a field coil which is located outside of a braking current circuit and is switchable on and off by said at least one contact set for a generator operation and a braking operation.

11. A series motor as defined in claim 7, wherein at least one of said field coils has a switching off delay of at least 20 msec.

12. A series motor, comprising a braking device; a stator having a field winding and a pole shoe plate pack, said pole shoe plate pack of said stator having field coils and also having further means inducing a magnetic field; a rotatable armature; means for influencing a braking operation of said field winding, said means influencing a braking operation including braking means inducing an additional magnetic field in the braking operation; and a commutator and brushes through which said armature is supplied with current, said pole shoe plate pack having at least one pole provided with at least one groove.

13. A series motor as defined in claim 12, wherein said groove extends in a direction of main field lines produced by said field coil, said means inducing a magnetic field including a permanent magnet arranged in said groove.

14. A series motor as defined in claim 13, wherein said groove is formed as a throughgoing opening, said permanent magnet being arranged in said opening.

15. A series motor as defined in claim 13, wherein said groove is formed as a groove extending in a peripheral direction of said at least one pole.

16. A series motor as defined in claim 15, wherein said groove is formed as a throughgoing groove.

17. A series motor as defined in claim 15, wherein said groove is formed as a blind groove.

18. A series motor as defined in claim 17, wherein said blind groove is limited in an axial extension to a size of said permanent magnet.

19. A series motor as defined in claim 12, wherein said permanent magnet is surrounded outside of its poles with a non-magnetic layer with respect to said at least one pole of said pole shoe plate pack.

20. A series motor as defined in claim 19, wherein said non-magnetic layer is air.

21. A series motor as defined in claim 19, wherein said non-magnetic layer is a synthetic plastic material.

22. A series motor as defined in claim 13, wherein said permanent magnet is glued in said groove.

23. A series motor as defined in claim 17, wherein said blind groove has a dove-tailed shape.

* * * * *